US006031379A

United States Patent [19]

Takada et al.

[11] Patent Number: 6,031,379
[45] Date of Patent: Feb. 29, 2000

[54] PLASMA ION MASS ANALYZING APPARATUS

[75] Inventors: Shinichi Takada; Yoshitomo Nakagawa, both of Chiba, Japan

[73] Assignee: Seiko Instruments, Inc., Chiba, Japan

[21] Appl. No.: 08/724,996

[22] Filed: Oct. 3, 1996

[30] Foreign Application Priority Data

Oct. 19, 1995 [JP] Japan .................................... 7-271405

[51] Int. Cl.$^{7}$ ............................ G01N 27/62; H01J 49/20; B01D 59/44

[52] U.S. Cl. .......................... 324/466; 324/459; 324/464; 250/281; 250/294

[58] Field of Search .................................... 324/459, 464, 324/466; 250/281, 294, 298, 299

[56] References Cited

U.S. PATENT DOCUMENTS

| | | | |
|---|---|---|---|
| 4,999,492 | 3/1991 | Nakagawa | 250/281 |
| 5,202,562 | 4/1993 | Koga et al. | 250/281 |
| 5,481,107 | 1/1996 | Takada et al. | 250/281 |
| 5,559,337 | 9/1996 | Ito et al. | 250/288 |
| 5,616,918 | 4/1997 | Oishi et al. | 250/288 |
| 5,804,821 | 9/1998 | Nakagawa | 250/288 |

FOREIGN PATENT DOCUMENTS

| | | |
|---|---|---|
| 1309300 | 12/1989 | Japan . |

OTHER PUBLICATIONS

"Basic and Application of ICP Light Emission Analysis" by Haraguchi, published by Kohdansha Scientific, Oct. 1986, pp. 98–108.

"An Introduction To Inductively Coupled Plasma Source Mass Spectometry" by Alan R. Date, Trends in Analytical Chemistry, vol. 2, No. 10, 225–230, 1983 (month unavailable).

*Primary Examiner*—Glenn W. Brown
*Attorney, Agent, or Firm*—Loeb & Loeb, LLP

[57] ABSTRACT

A mechanism is provided for reducing contamination of the interior of an apparatus by a sample and for performing a stable measurement. An ion lens has an Einzel lens for converging an ion beam, a deflector for deflecting the ion beam and a pair of compensation electrodes each composed of one or more elements. A mechanism is provided for controlling a voltage to be applied to each of the electrodes as desired. Also, alternatively, a shield plate is provided in a flow path of the ion beam. A drive mechanism is provided for projecting and retracting the shield plate. With such an arrangement, it is possible not only to effectively detect a small amount of impurities contained in a sample but also to stably measure the concentration thereof.

15 Claims, 3 Drawing Sheets

PLASMA ION MASS ANALYZYING APPARATUS

BACKGROUND OF THE INVENTION

1. Field of the Invention

The present invention relates to a plasma ion mass analyzing apparatus for identifying and measuring a minute amount of an element contained in a sample.

2. Description of the Related Art

A conventional structure will be described with reference to FIG. 3 in which a reference numeral 1 denotes a plasma generating device, and numeral 2 denotes a plasma generated by the plasma generating device 1. For example, the plasma generating device 1 may be an induction coupling plasma generating device disclosed in "Basic and Application of ICP Light Emission Analysis" (by Haraguchi, Kohdansha Scientific) or a microwave induction plasma generating device disclosed in Japanese Patent Application Laid-Open No. Hei 1-309300. A sample (not shown) to be analyzed is ionized by being introduced into the plasma 2 maintained by the plasma generating device 1. Numeral 3 denotes a sampling cone, numeral 4 denotes a skimmer cones and numeral 5 denotes a vacuum pump. The sampling cone 3 has at its tip end of conical shape an opening having a diameter of 0.8 to 1.2 mm. The skimmer cone 4 has at its tip end of conical shape an opening of 0.3 to 0.6 mm. A sampling interface is composed of the sampling cone 3 and the skimmer cone 4. When conducting an analysis, a line between the sampling cone 3 and the skimmer cone 4 is evacuated down to about 1 Torr by the vacuum pump 5 (generally, a rotary pump). Reference numeral 6 denotes a vacuum container, numeral 7 denotes an ion lens, numeral 8 denotes a mass analyzer, numeral 9 denotes a detector, and numeral 12 denotes a data processor. The interior of the vacuum container 6 is evacuated by other vacuum pumps 5. In a chamber where the ion lens 7 is disposed, the pressure is maintained at about $10^{-4}$ Torr, and in a chamber where the detector 9 is disposed, the pressure is maintained at $10^{-6}$ Torr. These vacuum pumps 5 may be generally turbo molecular pumps or oil diffusion pumps.

The sample which has been ionized by the plasma 2 is inputted into the ion lens 7 through the openings of the sampling cone 3 and the skimmer cone 4 together with rays of light of the plasma 2. The ion lens 7 serves to converge the ions and to introduce only ions from the sample. The mass analyzer 8 serves to introduce a predetermined mass out of the incident ions thereinto. For example, this analyzer 8 may be a quadrupole mass analyzer. The detector 9 serves to detect ions which have passed through the mass analyzer 8 and to feed an electric signal to the data processor 12. For example, this may be a Channeltron made by Galileo Co. The data processor calculates the mass of the ions from the setup of the mass analyzer 8 when the ions are detected by the detector 9 and specifies the kind of ions to thereby calculate a concentration of the ions specified by the detected intensity of the detector 9, i.e., the impurity contained in the sample.

The ion lens 7 will now be described with reference to FIG. 2 which shows a schematic view of the ion lens. In FIG. 2, reference numeral 13 denotes a sampling interface axis, characters 14*a*, 14*b* and 14*c* denote electrodes of a converging lens 14, characters 15*a* and 15*b* denote deflector electrodes of a deflector 15, numeral 16 denotes an aperture, and numeral 17 denotes an axis of the mass analyzer. The ion lens 7 is composed of the electrodes 14*a*, 14*b* and 14*c* of the converging lens 14, the electrodes 15*a* and 15*b* of the defector 15 and the aperture 16. The sampling interface axis 13 passes through the opening of the sampling cone 3 and the opening of the skimmer cone 4 and a beam of ions which has passed through the opening of the skimmer cone 4 enters the ion lens along the sampling interface axis 13. The converging lens 14 is composed of the electrodes 14*a*, 14*b* and 14*c* each of which is formed into a plate-like shape having an opening around the sampling interface axis 13. When a suitable voltage is applied to each of the electrodes 14*a*, 14*b* and 14*c* of the converging lens 14, the beam of ions is converged. Such a converging lens 14 is called an Einzel lens.

The deflector 15 is provided for displacing, in translation, the axis of the ion beam which has been inputted along the sampling interface axis 13. Namely, the ion beam that has been inputted into one electrode 15*a* of the deflector 15 is deflected by a predetermined angle, and the deflected ion beam is then deflected in the opposite direction by the same predetermined angle by the other electrode 15*b* of the deflector 15. The mass analyzer axis 17 corresponds to an optical axis of an incident window into which the species selected by the mass analyzer 8 is to be inputted and is positioned in parallel with the sampling interface axis 13 at an interval of about 10 mm. Thus, the axis of the ion beam (optical axis) is deflected from the sampling interface axis 13 to the mass analyzer axis 17. It should be noted that the ion beam is defected by the deflector 15, but light rays from the plasma 2 will not be inputted into the mass analyzer 8 or the detector 9 since light rays pass straight through the deflector 15 although the ray will pass through the openings of the sampling cone 3 and the skimmer cone 4 which are the sampling interface.

Only the ion species of the component to be detected, contained in the sample, passes through the mass analyzer 8 along the mass analyzer axis 17. The ion species which has passed through the mass analyzer 8 reaches the incident window of the detector 9, and the ion species of the desired component is detected by the detector 9. The detection signal from the detector 9 is inputted into the data processor 12 and is used for calculating the concentration of the desired component contained in the sample (i.e., a minute amount of the impurity).

Although the plasma ion mass analyzer apparatus has a high sensitivity, in the case where a high concentration sample is contained or a matrix component is contained at a high concentration in the sample, the high concentration components contaminates the interior of the apparatus and remains as a residue to adversely change the measurement value or stick to the interface portion, the ion lens, the mass analyzer and the detector within the apparatus to cause degradation in performance of the analyzer.

In case of the measurement of the sample, the occurrence of the above-described disadvantages is accelerated due to a period of time until the stabilization of the signal representative of the introduction of the sample into the plasma, and another period of time until the sample is eliminated from the plasma after the completion of the measurement, in addition to the period of time for the actual measurement. This is because the ion species of the sample component is introduced particularly into the detector of the plasma ion mass analyzing apparatus.

SUMMARY OF THE INVENTION

In order to overcome the above-noted problems, according to the present invention, there is provided an apparatus for preventing a sample component from entering the interior of the apparatus except during the time period of actual measurement. Also, a method is provided therefore. The apparatus comprises: a plasma ion source for ionizing a sample in a plasma; a sampling interface for introducing the produced ions into a vacuum container; an ion lens disposed in the vacuum container; a mass analyzer; and a detector. In such an apparatus, a potential or a polarity for a quadrupole field produced by 90° electrodes is changed so that the direction of the ion beam is switched at high speed. A shutter is provided between the sampling cone and the mass analyzer for separating the ions according to mass so that the ion beam is introduced into the mass analyzer and the detector only for the period of time for the measurement of the sample.

In the plasma ion mass analyzing apparatus, a potential or a polarity given to axis offset type ion lens electrodes is changed so that the ion beam direction is switched at high speed. The ion beam is introduced into the mass analyzer and the detector only for the period of time for the measurement of the sample.

In the plasma ion mass analyzing apparatus, a shield plate is projected and retracted at high speed by an actuator such as an electromagnetic solenoid or the like in the middle of a flow path of the ions produced from the plasma to thereby form a shutter means for preventing the ions/particles from entering the detector from the plasma ion source. The ion beam is introduced into the mass analyzer and the detector only for the measurement period of time for the sample.

DESCRIPTION OF THE PREFERRED EMBODIMENTS

Figure 1:
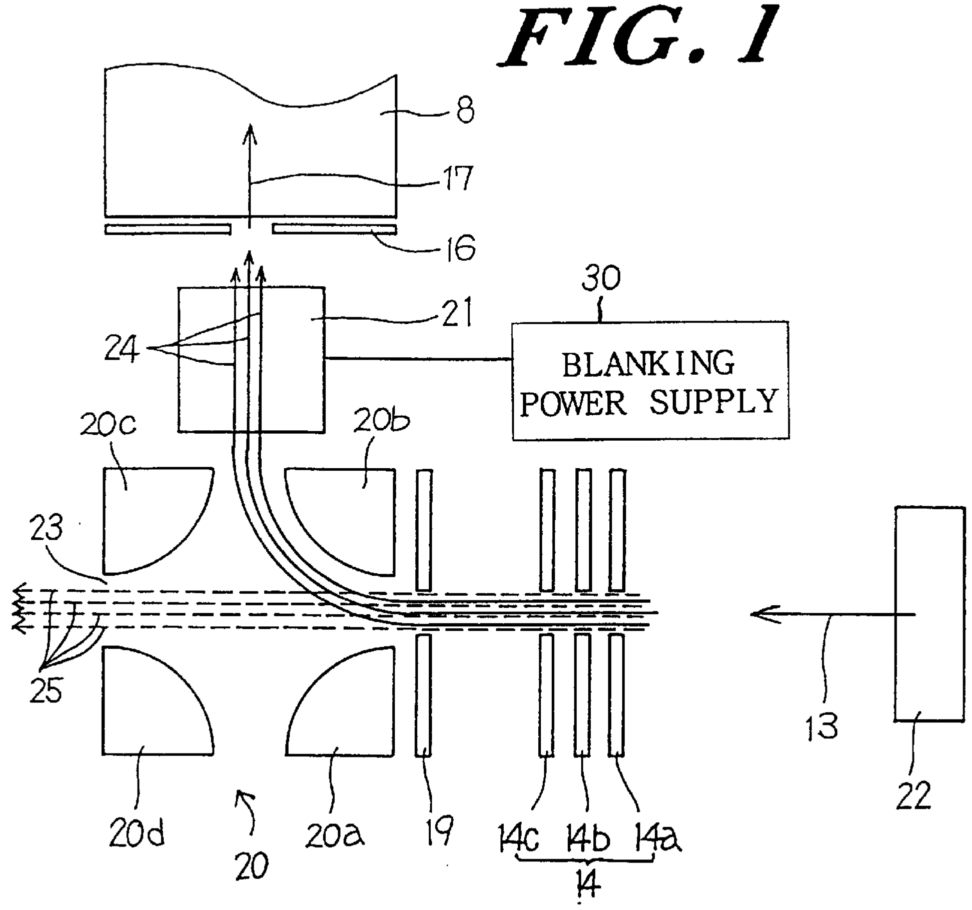
FIG. 1 is a cross-sectional view showing a primary part of the present invention.
Figure 4:
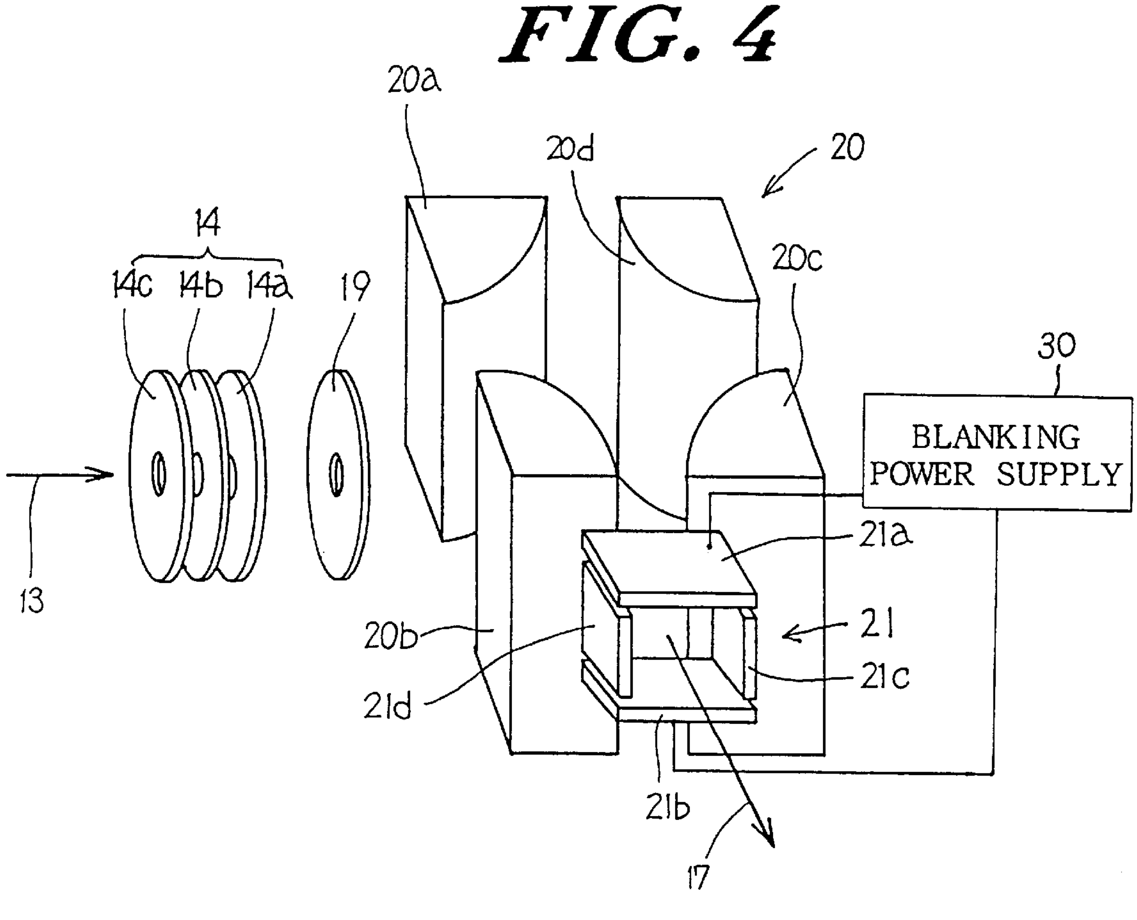
FIG. 4 is a perspective view showing a primary part of the invention.

The present invention will now be described in detail by way of example with reference to the accompanying drawings. FIGS. 1 and 4 show an embodiment of the invention in which a 90° deflected type deflector is used.

Figure 2:
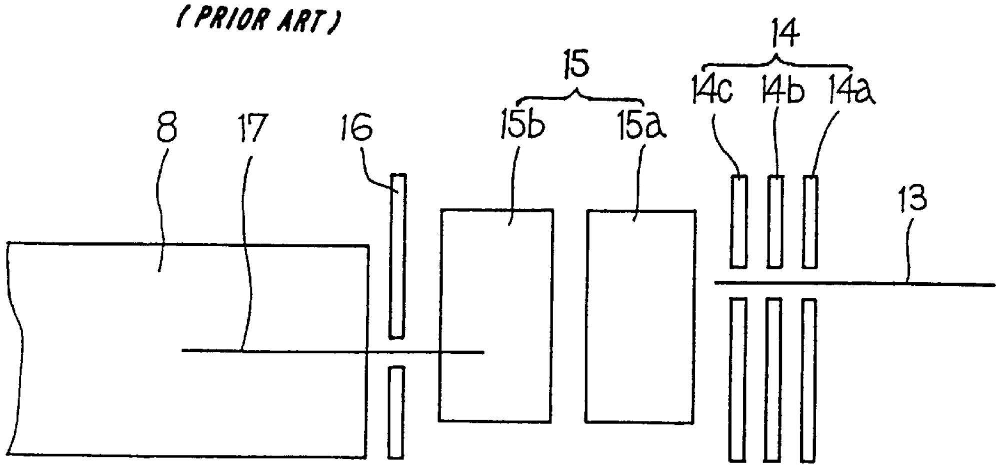
FIG. 2 (PRIOR ART)
FIG. 2 is a cross-sectional view showing an ion lens portion of a conventional apparatus.
Figure 3:
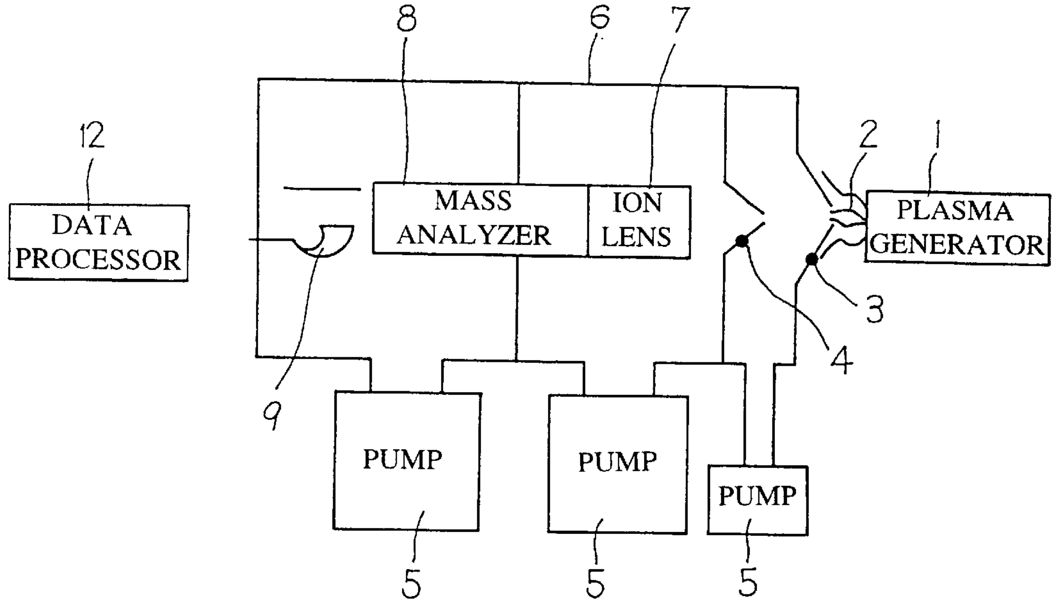
FIG. 3 (PRIOR ART)
FIG. 3 is a cross-sectional view showing a conventional apparatus.

A sampling interface 22 composed of the sampling cone 3 and the skimmer cone 4 or the like is substantially the same as conventional components shown in FIG. 3. The main difference between the structure indicated in FIGS. 2 and 3 as prior art resides in the structure of the ion lens 7. In the same way as in the conventional system, the ions which have passed through the sampling interface 22 and have been inputted into the converging lens 14 along the sampling interface axis 13 are converged by the converging lens 14.

The ion beam which has passed through the converging lens 14 passes through a deflector inlet aperture 19 disposed in front of the ion beam incident portion of a quadrupole deflector 20. The deflector inlet aperture 19 is provided for defining the contour of the ion beam which passes therethrough. The quadrupole deflector 20 is composed of four polarity electrodes 20*a*, 20*b*, 20*c* and 20*d* each of which is substantially defined by equally dividing a cylinder into quarters and each of which is disposed with its round side facing the other quarter cylinders in parallel and in a symmetric manner. The ion beam is inputted into an incident inlet of the quadrupole deflector 20 and is deflected through 90° along the round surface of one of the quadrupole electrodes 20*b*. A compensation electrode 21 disposed in an outlet of the ion beam of the quadrupole deflector 20 is composed of four electrodes 21*a*, 21*b*, 21*c* and 21*d*.

When a suitable voltage is applied to each of the electrodes 14*a*, 14*b* and 14*c* of the converging lens 14, the ion beam that has been inputted along the sampling interface axis 13 may be converged so as to be focused in the vicinity of the inlet of the mass analyzer 8. When a suitable voltage is applied to each of the quadrupole electrodes 20*a*, 20*b*, 20*c* and 20*d* of the quadrupole deflector 20, the incident ion beam may be deflected through 90°. The mass analyzer inlet aperture 16 has a plate-like shape having an opening around the mass analyzer axis 17, and serves to feed the ion beam having a suitable energy to the mass analyzer 8 by the selection of a suitable voltage. The mass analyzer inlet aperture 16 may be formed of a single element or otherwise a plurality of elements as desired. Such an ion lens causes the beam of ions to be detected to be introduced into the mass analyzer 8 and at the same time causes the rays of light 25 or neutral particles 23 of the plasma, which adversely affect the detector 9 (not shown in FIG. 1) as a background noise, to pass straight through the quadrupole deflector 20 but not to reach the mass analyzer 8.

When a suitable voltage is applied to each of the electrodes 21*a*, 21*b*, 21*c* and 21*d* of the compensation electrodes 21, it is possible to align the axis of the ion beam, which has been outputted from the quadrupole deflector 20, with the opening of the mass analyzer inlet aperture 16. Namely, the path 24 of the ion beam shown in FIG. 1 may be obtained.

A shutter means for preventing the ion beam from reaching the detector 9 will now be described. A blanking power source 30 is connected to a pair of opposite electrodes (for example, electrodes 21*a* and 21*b*) out of the respective electrodes 21*a*, 21*b*, 21*c* and 21*d* of the compensation electrode 21. The blanking power source 30 serves to apply a high level voltage to some extent to the pair of opposite electrodes and serves to prevent the ion beam, that is to pass through the compensation electrode 21, from reaching the mass analyzer inlet aperture 16 or the mass analyzer 8. In other words, it causes the pair of opposite electrodes (for example, electrodes 21*a* and 21*b*) to work as blanking electrodes. Also, a switch (not shown) is provided for the blanking power source 30 for controlling the effect of the blanking electrodes as desired. Namely, it has the function of a shutter mechanism. Furthermore, the switch of the blanking power source 30 cooperates with a switch for performing a substantial analyzing operation of the plasma ion mass analyzer so that it is possible to automatically prevent the ion beam from reaching the mass analyzer inlet aperture 16 or the mass analyzer 8 except for the measurement.

Furthermore, another embodiment which mainly pertains to the shutter mechanism will be explained. Instead of using the blanking power source 30, it is possible to prevent the ion beam from reaching the mass analyzer inlet aperture 16 or the mass analyzer 8 by changing the voltage to be applied to each electrode of the quadrupole deflector 20. Although the ion beam that has been inputted from the sampling interface is introduced into the detector 9 through the above-described mass analyzer 8 and converted into an electric signal upon measurement, it is possible to realize the shutter mechanism by setting the voltage to be applied to each electrode 20*a*, 20*b*, 20*c*, 20*d* of the quadrupole deflector 20 to thereby make the deflection angle equal to zero degrees to pass the ion beam straight through when the measurement is not effected. With such a shutter mechanism, since the ion beam is not caused to be introduced into the compensation electrode 21, the aperture 16, the mass analyzer 8 or the detector (not shown) except for during measurement, it is possible to avoid the contamination caused by the ions for these electrodes or detector.

Referring to FIG. 2, the shutter mechanism for an embodiment in case of an offset ion lens will be explained. A suitable voltage is applied to each of the deflector electrodes 15*a* and 15*b* of the deflector 15 so that the ion beam that has been introduced is deflected and caused to pass through the aperture 16 and is introduced into the deflector through the mass analyzer to obtain the electric signal. However, when the measurement is not effected, the applied voltage of the deflector 15*a*, 15*b* is set at 0 V to obtain the deflection angle 0° to thereby advance the ion beam straight to thereby realize the shutter mechanism. With such a shutter mechanism, since the ion beam is not caused to be introduced into the aperture 16, the mass analyzer 8 or the deflector (not shown), it is possible to avoid the contamination caused by the ions for these electrodes or detector.

Figure 5:
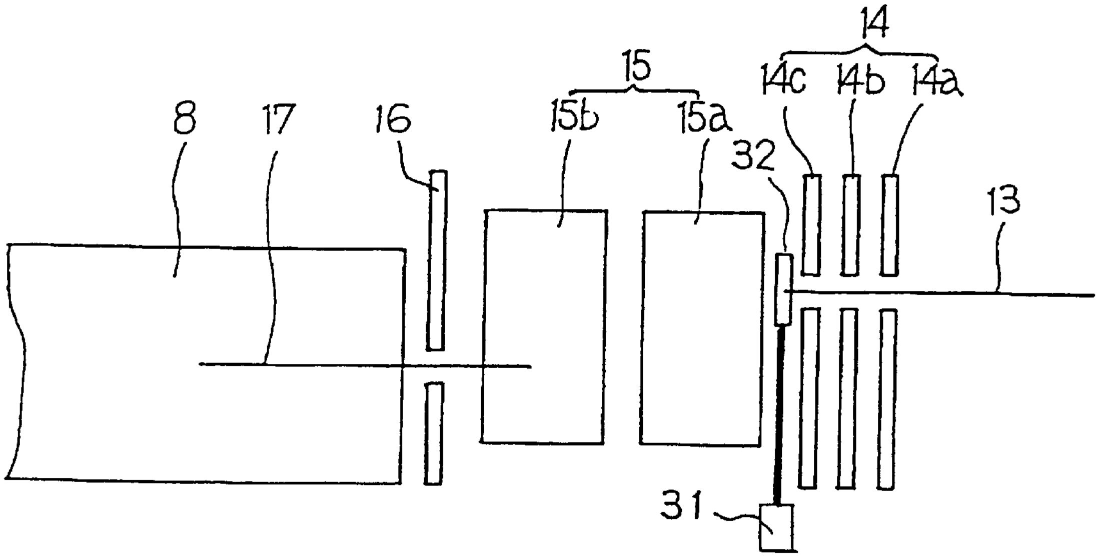
FIG. 5 is a cross-sectional view showing a primary part of another embodiment.

FIG. 5 shows an embodiment in which a shutter mechanism for projecting and retracting a shield plate 32 at high speed by the action of an actuator 31 such as an electromagnetic solenoid or the like is provided in the flow path of the ion in the offset lens. Description of the like components shown in FIG. 2 will be omitted. When the measurement is not being performed, it is possible to realize a shutter mechanism by inserting the shield plate 32 into the flow path of the ion beam. With such a shutter mechanism, since the ion beam is not caused to be introduced into the compensation electrode 21, the aperture 16, the mass analyzer 8 or the detector (not shown) except during the measurement, it is possible to avoid the contamination caused by the ions for these electrodes or detector. Incidentally, it is apparent that the shutter mechanism for projecting and retracting at high speed by the actuator 31 may be disposed in any position between the sampling interface and the mass analyzer 8.

To sum up, the above-described shutter mechanism is disposed in any position between the sampling interface and the mass analyzer 8 whereby it is possible to attain the objects of the present invention.

According to the present invention, since there is no fear that the film which causes the electric charge-buildup in the conventional technology would be adhered to the ion lens or the mass analyzer, it is possible to carry out the stable measurement at any time and to prolong the useful life of the detector. As a result, it is possible to ensure highly reliable analyses.

Various details of the invention may be changed without departing from its spirit or its scope. Furthermore, the foregoing description of the embodiments according to the present invention is provided for the purpose of illustration only, and not for the purpose of limiting the invention as defined by the appended claims and their equivalents.

What we claim is:

1. A plasma ion source mass analyzing apparatus comprising:

- a plasma ion source for ionizing a sample in a plasma to produce ions;
- a sampling interface for introducing the produced ions into a vacuum container;
- a converging lens disposed in the vacuum container for converging the ions;
- a mass analyzer for separating the ions on the basis of mass;
- a detector for detecting ions having a predetermined mass, separated by said mass analyzer; and
- means for preventing the produced ions from flowing from said plasma ion source into said mass analyzer during a period of time except for a period of time when the sample is subjected to mass analysis.

2. The apparatus of claim 1, wherein the means for preventing the produced ions from flowing from said plasma ion source into said mass analyzer comprises:

- 90-degree deflection electrodes disposed in a path of the produced ions between the converging lens and the mass analyzer for deflecting the direction of the produced ions by approximately 90 degrees; and
- compensation electrodes disposed in the ion path between the 90-degree deflection electrodes and the mass analyzer for adjusting the direction of the produced ions, the compensation electrodes being responsive to a voltage signal to alternatively permit the produced ions to enter or prevent them from entering the mass analyzer.

3. The apparatus of claim 2, wherein the voltage signal is supplied by a blanking power supply coupled to the compensation electrodes.

4. The apparatus of claim 1, wherein the means for preventing the produced ions from flowing from said plasma ion source into said mass analyzer comprises 90-degree deflection electrodes disposed in a path of the produced ions between the converging lens and the mass analyzer for deflecting the direction of the produced ions by approximately 90 degrees, the 90-degree deflection electrodes being responsive to a voltage signal to alternatively permit the produced ions to enter or prevent them from entering the mass analyzer.

5. The apparatus of claim 1, wherein the means for preventing the produced ions from flowing from said plasma ion source into said mass analyzer comprises an axis displacing deflector disposed in a path of the produced ions between the converging lens and the mass analyzer for displacing in translation an axis of the ion path, the axis displacing deflector being responsive to a voltage signal to alternatively permit the produced ions to enter or prevent them from entering the mass analyzer.

6. The apparatus of claim 1, wherein the means for preventing the produced ions from flowing from said plasma ion source into said mass analyzer comprises:

- a shield plate retractably disposed in a path of the produced ions between the sampling interface and the mass analyzer for blocking the produced ions; and
- an actuator connected to the shield plate for retracting the shield plate from the ion path and projecting the shield into the ion path.

7. The apparatus of claim 6, wherein the shield plate is disposed in the ion path immediately downstream from the converging lens.

8. The apparatus of claim 6, wherein the shield plate is disposed in the ion path upstream from the converging lens.

9. A method for mass analyzing a sample containing a component to be measured, comprising:

- ionizing the sample in a plasma ion source to produce a beam of ions;
- measuring the amount of the component contained in the sample by directing the ion beam into a mass analyzer; and
- preventing the beam of ions from entering the mass analyzer during a first period of time before the measuring step, and during a second period of time after the measuring step.

10. The method of claim 9, wherein the first period of time is a period when the beam of ions produced by the source becomes stabilized.

11. The method of claim 9, wherein the second period of time is a period when the sample is eliminated from the plasma source.

12. The method of claim 9, wherein the beam of ions is directed into the mass analyzer by a 90-degree deflection electrodes disposed in a path of the beam for deflecting the direction of the beam by approximately 90 degrees, and compensation electrodes disposed in the beam path between the 90-degree deflection electrodes and the mass analyzer for adjusting the direction of the beam, and wherein the beam of ions is prevented from entering the mass analyzer during the first and the second period of time by the compensation electrodes.

13. The method of claim 9, wherein the beam of ions is directed into the mass analyzer by a 90-degree deflection electrodes disposed in a path of the beam for deflecting the direction of the beam by approximately 90 degrees and compensation electrodes disposed in the beam path between the 90-degree deflection electrodes and the mass analyzer for adjusting the direction of the beam, and wherein the beam of ions is prevented from entering the mass analyzer during the first and the second period of time by the 90-degree deflection electrodes.

14. The method of claim 9, wherein the beam of ions is directed into the mass analyzer by an axis displacing deflector disposed in a path of the beam for displacing in translation an axis of the beam, and wherein the beam of ions is prevented from entering the mass analyzer during the first and/or the second period of time by the axis displacing deflector.

15. The method of claim 9, wherein the beam of ions is prevented from entering the mass analyzer during the first and/or the second period of time by a shield plate retractably disposed in a path of the beam of ions.

* * * * *